(12) United States Patent
Habowski

(10) Patent No.: US 11,784,551 B1
(45) Date of Patent: Oct. 10, 2023

(54) FLEXIBLE ELECTRIC ACTUATOR

(71) Applicant: Tyler Habowski, Glen Cove, NY (US)

(72) Inventor: Tyler Habowski, Glen Cove, NY (US)

(73) Assignee: Kyber Labs Inc., Brooklyn, NY (US)

( * ) Notice: Subject to any disclaimer, the term of this patent is extended or adjusted under 35 U.S.C. 154(b) by 0 days.

(21) Appl. No.: 17/820,914

(22) Filed: Aug. 19, 2022

(51) Int. Cl.
  *H02K 41/035* (2006.01)
  *H02K 41/03* (2006.01)

(52) U.S. Cl.
  CPC ................ *H02K 41/0356* (2013.01)

(58) Field of Classification Search
  CPC ..... H02K 41/0356; H02K 41/02; H02K 41/03
  USPC ........................... 310/12.16, 12.24
  See application file for complete search history.

(56) References Cited

U.S. PATENT DOCUMENTS

2013/0237751 A1* 9/2013 Alexander ............ H02K 33/16
600/38

FOREIGN PATENT DOCUMENTS

JP             2010130805 A  *  6/2010

\* cited by examiner

*Primary Examiner* — Jose A Gonzalez Quinones
(74) *Attorney, Agent, or Firm* — Tatonetti IP

(57) ABSTRACT

Implemented is an electric actuator that includes a tubular stator and a slider. The tubular stator comprises a flexible stator support member and at least one electrical coil, forming a flexible outer tube. The slider is fitted within a tubular stator. The stator and the slider can axially slide relative to one another. The slider includes a flexible slider support member and at least one magnet, which together form a flexible inner tube. The electric actuator also includes an input power wire and an output power wire that are disposed within the slider. The stator and the slider are both deformable and may axially move relative to another while deformed due to at least one Lorentz force generated within the electric actuator.

17 Claims, 5 Drawing Sheets

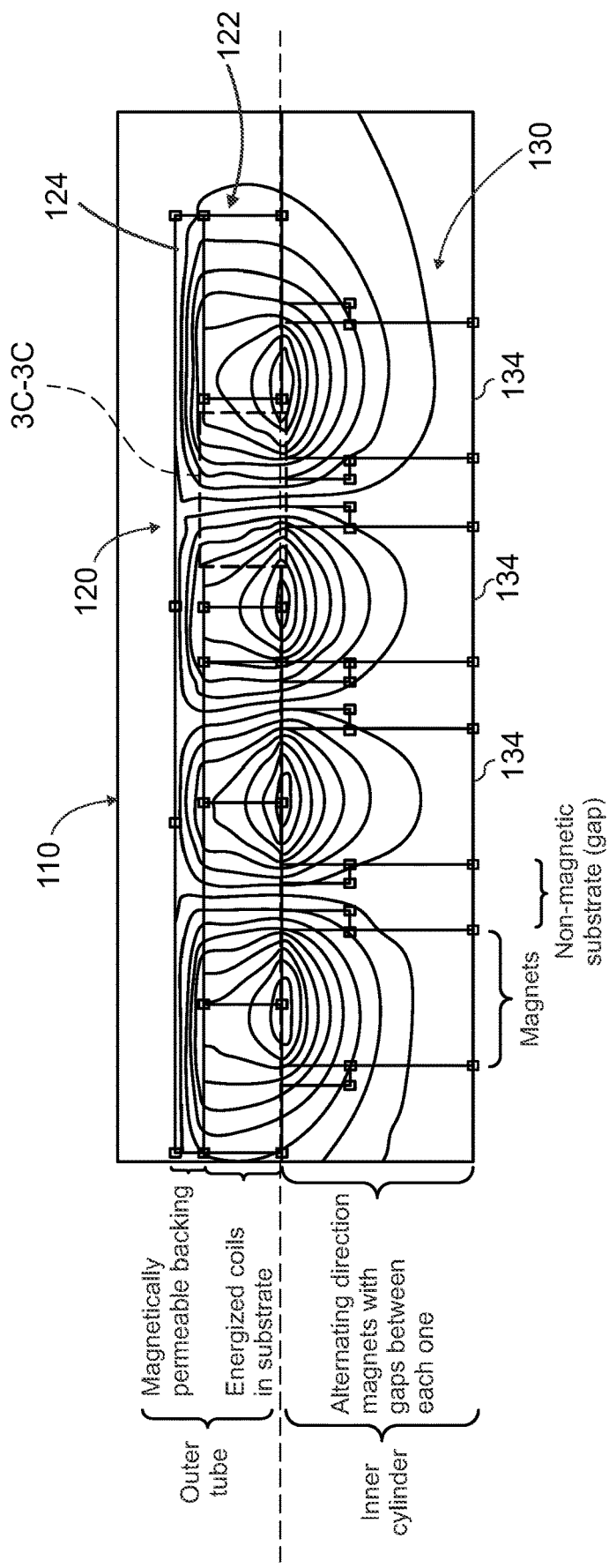

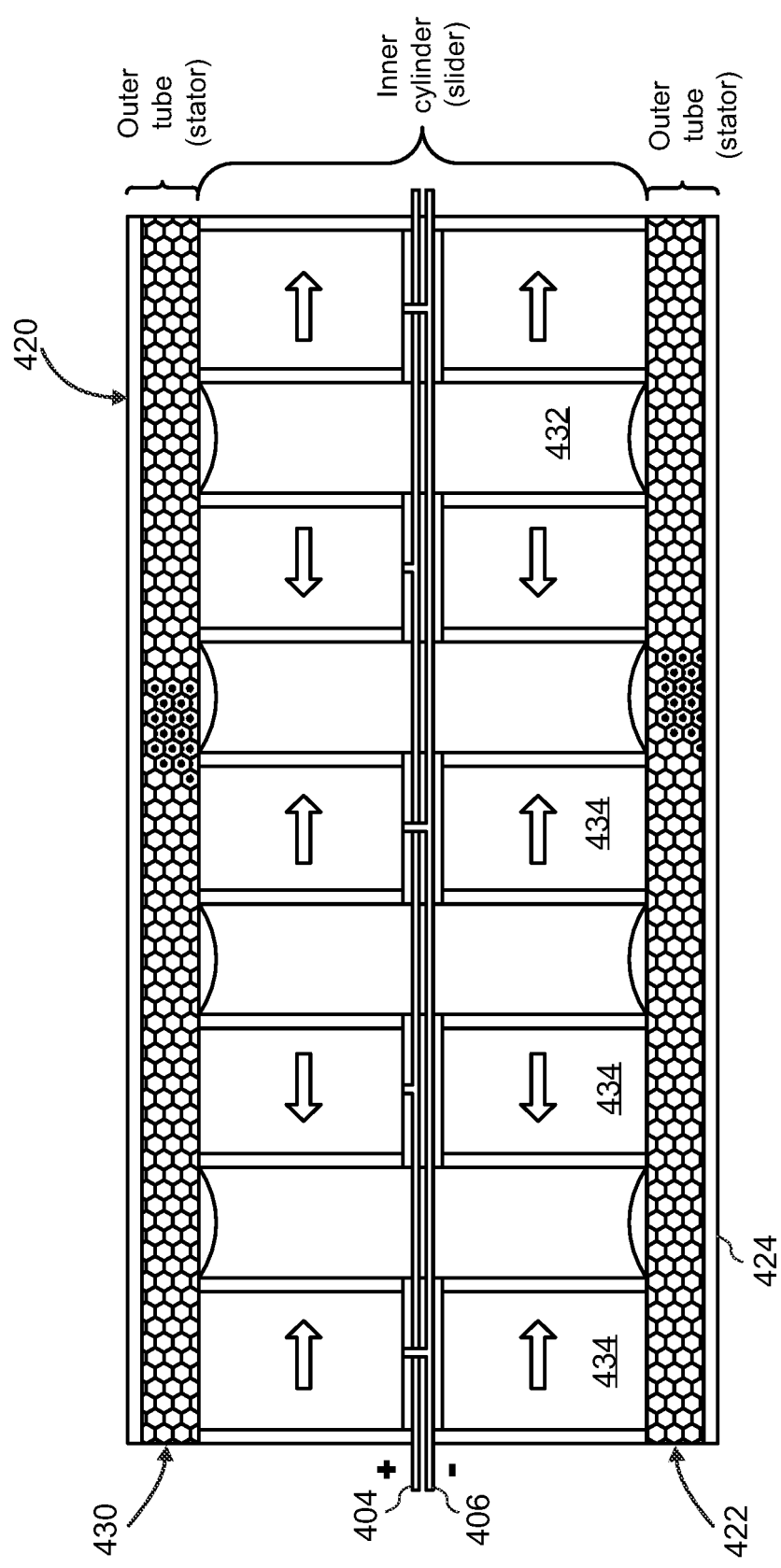

FLEXIBLE ELECTRIC ACTUATOR

BACKGROUND

Conventional linear induction motors (LIMs) have a stator, i.e., primary, and a rotor, i.e., secondary, which axially translates relative to the stator. The stator typically has a rigid body with multiple electrical coils made of conductive material, thereon. The rotor is typically a plate or a rod. Permanent magnets may be disposed inside the rod of the rotor. When current is provided to the stator, the electromagnetic fields of the coils repel and attract the rotor's magnets to extend and retract the rotor accordingly. Such motors are rigid and inflexible and are often incapable of being used in applications requiring dynamic movement.

SUMMARY

A linear, flexible electric actuator including a stator and a slider is implemented. The stator includes a flexible substrate and at least one coil, forming a flexible outer tube with a through-hole. The at least one coil can be in the form of a single continuously and progressively wound wire. The slider is fitted within the through-hole of the stator. The slider includes a flexible substrate and magnets which together form a flexible inner tube. The stator and the slider can axially slide relative to one another. The stator and the slider are both flexible. In other words, the stator and the slider can be deformed, for example, they may be bent, twisted, extended, and/or compressed under a given load. While deformed by these loads, the stator and/or the slider may axially move relative to each other and thus the deflection does not impact the functionality of the actuator.

The electric actuator extends and retracts based on a Lorentz-type interaction between the magnetic fields of the magnets and the electromagnetic field(s) of the stator's electrical coil(s). When a current is applied across the electric power cables of the slider, electrical coupling devices in each magnet of the slider locally conduct electricity to the innermost coils of the stator so that a tangential electric field is generated that interacts with the radial magnetic field of the permanent magnets relative to the longitudinal axis of the electric actuator. The resulting Lorentz forces, which are perpendicular relative to both the tangential electromagnetic and radial magnetic fields, axially apply force to the stator and the slider relative to one another. Hence, the net actuation force, generated by the Lorentz interaction in each section between the magnets and the electrical coil, is the driving force behind the actuator.

Unlike conventional linear electric actuators, with a brushless design and a digitally controlled electromagnetic field arrangement, the electric actuator of the present disclosure has a brushed design. The magnets of the slider and/or the sliding electrical couplers directly contact and pass current to the exposed interior of the electrical coil. Thereby, the electrical coil's current and the resulting electromagnetic field arrangement are mechanically controlled by the physical position of the magnets.

The electric actuator operates by energizing the slider first to subsequently energize the electrical coil of the stator. Hence, the electric actuator does not directly energize the stator as in conventional electric actuators. To energize the slider first, the input and output wires, i.e., positive and negative power wires, are disposed within the slider. Each magnet assembly may electrically couple to the input and output wires and the electrical coil. Alternatively, a sliding electrical coupler or other electrical connection device which is housed within each magnet may electrically couple and conduct electricity from the input and output wires to the electrical coil of the stator. Also, the magnets connect to the input and output wires in an alternating pattern such that each magnet is electrically coupled to the juxtaposed or neighboring magnets via the electrical coil of the stator. Thereby, the current is initially transferred from the input and output power wires to the slider. The magnets themselves or the electrical connection devices of the magnets transfer the current to the electrical coil, which in turn transfers the current back to the slider. Hence, the brushed design of the electric actuator enables the current to flow to and from the stator via the internal slider.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from reading the following Detailed Description and reviewing the associated drawings.

DESCRIPTION OF THE DRAWINGS

FIGS. 3A-3C are illustrative representations of the electromagnetic and magnetic forces acting within the flexible electric actuator; and FIG. 4 is an illustrative representation of a partial cross-sectional view of another embodiment of a flexible electric actuator.

Like reference numerals indicate like elements in the drawings. Elements are not drawn to scale unless otherwise indicated.

DETAILED DESCRIPTION

Figure 1:
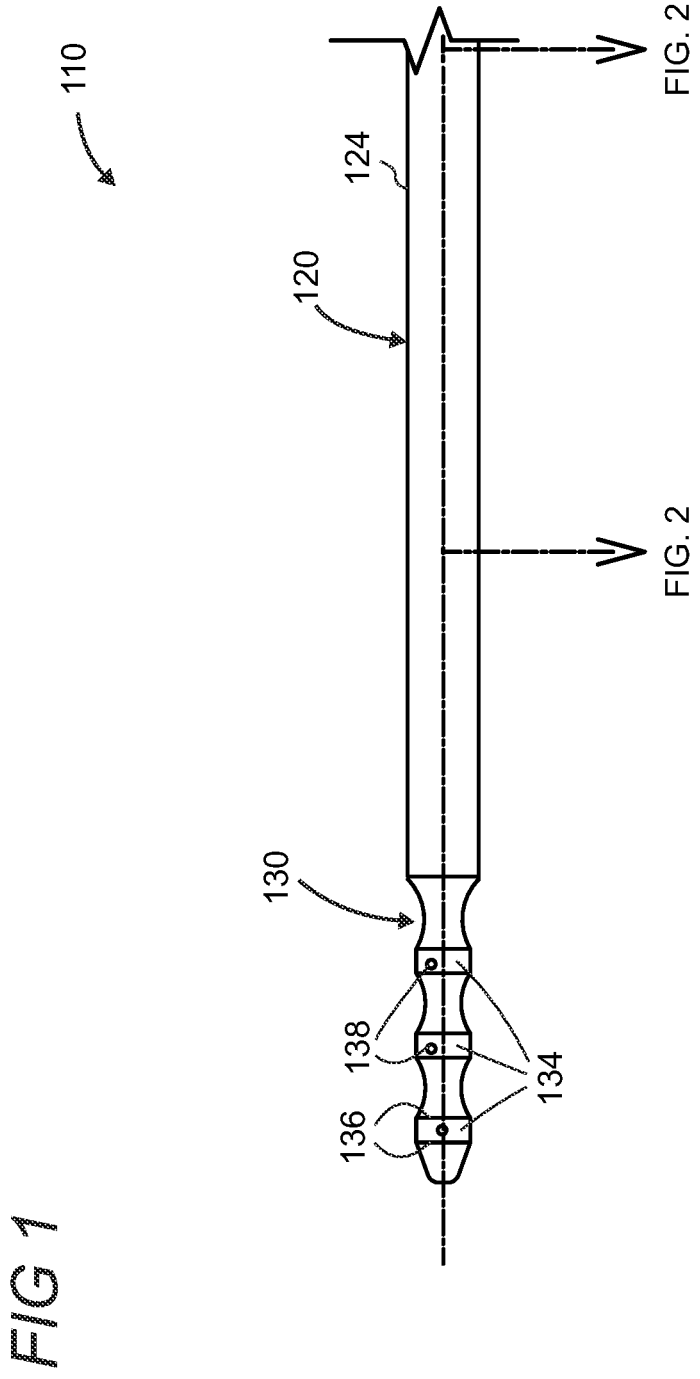
FIG. 1 is an illustrative representation of an electric actuator system comprising a power source and a flexible electric actuator.
Figure 2:
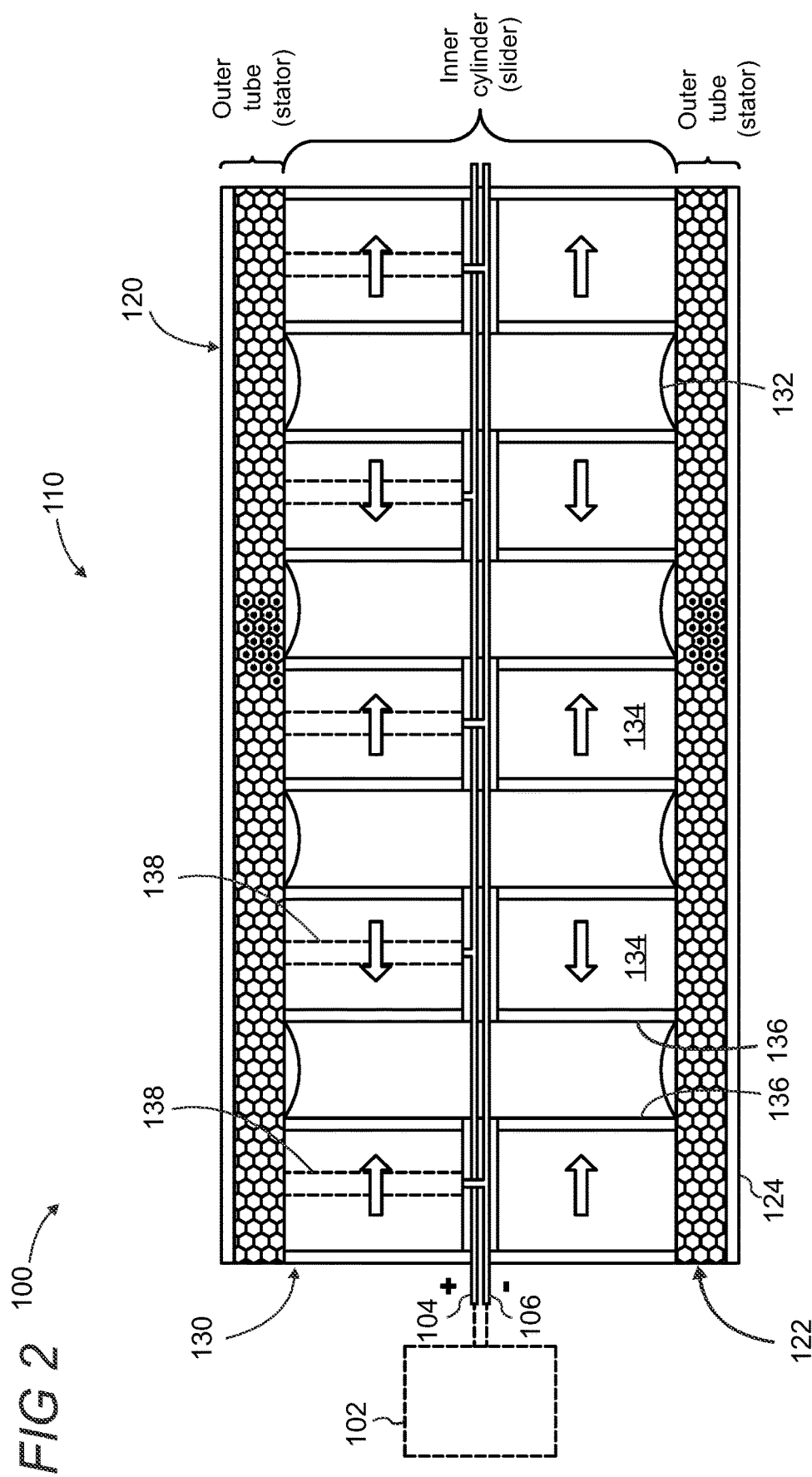
FIG. 2 is an illustrative representation of a cross-section of the flexible electric actuator, taken across line 2-2 in FIG. 1.

FIGS. 1-2 are illustrative representations of an electric actuator system 100 comprising a power source 102 and a flexible electric actuator 110. The flexible electric actuator 110 is a brushed, linear actuator that operates due to at least one internal Lorentz force. Unlike brushless actuators, the brushed design of the flexible electric actuator 110 does not require complex electronics to actuate its components. Thereby, the flexible electric actuator 110 reduces costs and complexity compared to other electric actuators.

The flexible electric actuator 110 can linearly or axially move while being distorted from its original resting position, e.g., flexed, bent, twisted, stretched, and/or compacted. The flexible electric actuator 110 may be used to actuate one or more elements. The flexible electric actuator 110 may be used in any desired application, especially one which requires dynamic movement. For example, the flexible electric actuator 110 may be used as a robotic actuator, behaving like a muscle fiber, to extend and/or retract a robotic arm or leg. Additionally, for example, the flexible electric actuator 110 may be used as an actuator of a prosthetic device that is disposed inside a human body. Furthermore, two or more flexible electric actuators 110 may be arranged together. For example, multiple flexible electric actuators 110 can be arranged around a robotic chassis, mechanical skeleton, or other dynamic structure to act as a form of artificial robotic muscle that functions similarly to natural, biological muscle.

The power source 102 supplies current and is electrically coupled to one or more electric actuators 110. The power source 102 can be in the form of any desired power source for supplying electrical power. For example, the power source 102 can be in the form of aPWM or variable voltage power source.

The electric actuator 110 comprises a tubular stator 120 and a slider 130 disposed within and electrically coupled to the tubular stator 120. The slider 130 and/or the tubular stator 120 are configured for bending and axially sliding. For example, the slider 130 and the tubular stator 120 may both be bent and subsequently actuated such that the tubular stator 120 and the slider 130 axially move relative to one another. Additionally, for example, the tubular stator 120 and the slider 130 may be bent, and the slider 130 may axially slide relative to the tubular stator 120, which remains stationary. The electric actuator 110 is electrically coupled to the power source 102 by an input power wire 104 and an output power wire 106. The input power wire 104 and the output power wire 106 are disposed within the slider 130. In some alternative embodiments, the electric actuator 110 may comprise one or more tubular stators 120 and/or one or more sliders 130. It is noted that the brushed design of the electric actuator 110 also allows a user to easily measure the position of the actuator 110, such as an extended or retracted position, by measuring the resistance between the stator 120 and the ground, i.e., the negative output power wire 106.

The tubular stator 120 comprises at least one electrical coil 122 and a flexible stator support member 124 coupled to the at least one electrical coil 122. The tubular stator 120 defines an outer tube with a through-hole for receiving the slider 130 therein. The cross-sectional shape of the tubular stator 120 may generally match the cross-sectional shape of the slider 130. The tubular stator 120 may be referred to as an outer tube. The term "tubular" used in conjunction with the stator 120 may refer to the generally circular or oval shape and through-hole of the stator 120.

The at least one electrical coil 122 has an inner and an outer periphery. The at least one electrical coil 122 can be in the form of a single or multiple coils. For example, the at least one electrical coil 122 can be in the form of a single, continuously wound wire. The at least one electrical coil 122 may comprise any desired conductive material, such as copper. For example, the at least one electrical coil 122 can be in the form of an insulated copper wire. The windings at the inner periphery of the electrical coil 122 can be at least partially exposed. In other words, the lowermost windings may not have insulation wrapping around at least a portion thereof so that the slider 130 may directly contact the electrically conductive material of the electrical coil 122. For example, the insulation at the inner periphery of the electrical coil 122 may be cut or otherwise removed after the wire has been wound to form the electrical coil 122.

The at least one electrical coil 122 can also have a progressive winding pattern. The at least one electrical coil 122 can be progressively wound such that one or more subsequent windings of the at least one electrical coil 122 wrap back and over one or more previous windings of the at least one electrical coil 122. As denoted by the line pattern overlayed onto the upper portion of the electrical coil 122 in FIG. 2, by way of example only, each progressively wound section can have a first set of windings, a second set of windings that wrap back and over, i.e., above and rearwardly of, the first set of windings, and a third set of windings that wrap above and forwardly of the second set of windings. In a numerical designation, the progressive winding pattern may include sequential windings 1 to 4 at the bottom and progressing forwardly, windings 5 to 7 on top of windings 1 to 4 and progressing rearwardly, windings 8 and 9 on top of windings 5 to 7 and progressing forwardly, windings 10 and 11 at the same level and progressing forwardly of windings 1 to 4, windings 12 and 13 on top of windings 10 and 11 and progressing rearwardly, windings 14 and 15 on top of windings 12 and 13 and progressing forwardly, and so on.

The progressive winding pattern of the at least one electrical coil 122 is desirable to distribute the current throughout all the layers of the at least one electrical coil 122. A conventional layered winding pattern does not work effectively as the conventional winding pattern does not allow current to go through the upper windings, which are located on top of the lower, previous windings.

The flexible stator support member 124 contacts and supports the at least one electrical coil 122. The flexible stator support member 124 prevents the at least one electrical coil 122 from unraveling without limiting the movement, i.e., bending, of the least one electrical coil 122. The flexible stator support member 124 may also function as a magnetically permeable backing. The flexible stator support member 124 can be in the form of a flexible stator substrate. The stator substrate can be molded onto the outer periphery of the at least one electrical coil 122. The flexible stator support member 124 may comprise any desired flexible material. The flexible stator support member 124 may comprise a non-magnetic material.

The tubular stator 120 may further comprise additional structural components. For example, the tubular stator 120 may comprise a backing structure of netting, cords, or other material, which can be added onto and/or embedded within the flexible stator support member 124. Additionally, for example, the tubular stator 120 may include flexible braided iron sheathing in place of or in addition to the flexible stator support member 124. Such additional structural components may increase the tensile strength of the flexible stator support member 124.

The slider 130 is disposed within and electrically coupled to the tubular stator 120. The slider 130 is approximately concentrically fitted within the through-hole, defined by the tubular stator 120. The slider 130 comprises a flexible slider support member 132 and at least one magnet 134. The slider 130 may additionally comprise at least one magnetic augmentation member 136. The slider 130 may or may not additionally comprise at least one sliding electrical coupler 138 for electrically coupling the input and output power wires 104, 106, and the at least one electrical coil 122. The slider 130 may be referred to as an inner tube or cylinder. The slider 130 may have a length which is shorter than the length of the stator 120.

The flexible slider support member 132 supports the magnet(s) 134, the input power wire 104 and output power wire 106, and all other components of the slider 130. The flexible slider support member 132 allows the otherwise rigid components of the slider 130, e.g., magnet(s) 134, to flex, bend, or otherwise deform to accommodate any desired dynamic movement. The slider support member 132 is concentrically fitted within the stator 120. The slider support member 132 may be a single component or composed of multiple components that fit together between each magnet 134. For example, the slider support member 132 can be in the form of a long, flexible, and generally cylindrical tube. The slider support member 132 can have a through-hole for accommodating the input power wire 104 and the output power wire 106. The slider support member 132 can be in the form of a flexible molded substrate. The slider support member 132 may comprise any desired flexible material. The flexible slider support member 132 may comprise a non-magnetic material.

Each magnet 134 is coupled to the flexible slider support member 132. Each magnet 134 has a magnetic field. Each magnet 134 may comprise a disc-shaped magnet 134 with a bore or cutout for accommodating the input power wire 104 and the output power wire 106. Each magnet 134 may comprise any desired material. For example, each magnet 134 may be in the form of a neodymium magnet.

One or more of the magnets 134 may directly contact at least a portion of the at least one electrical coil 122. Additionally or alternatively, each magnet 134 may house a corresponding sliding electrical coupler 138 that conducts electricity from the input power wire 104 and the output power wire 106 to the innermost coil of the stator 120. Hence, the outer periphery of each magnet 134 and/or the sliding electrical coupler 138 may slidably engage with the exposed wires of the at least one electrical coil 122 of the stator 120. Thereby, each magnet 134 and/or each sliding electrical coupler 138 can electrically couple the input and output power wires 104, 106, and the at least one electrical coil 122.

The at least one magnet 134 may be in the form of a plurality of magnets 134 coupled to the flexible slider support member 132. The magnets 134 can be arranged in a magnetically opposed configuration such that a pair of neighboring magnets 134 magnetically oppose one another, as denoted by the arrows in FIG. 2. Also, the magnets 134 can be electrically coupled to the input and output power wires 104, 106 in an alternating pattern of positive and negative current flow such that a given magnet 134 is electrically coupled to its juxtaposed or neighboring magnets 134 via the at least one electrical coil 122 of the tubular stator 120.

Each sliding electrical coupler 138 is connected to and housed within each magnet 134. Each sliding electrical coupler 138 conducts electricity. The at least one sliding electrical coupler 138 is configured for electrically coupling a respective magnet 134 to the at least one electrical coil 122 while still allowing free axial motion. More particularly, each sliding electrical coupler 138 electrically couples the input and output power wires 104, 106 and the at least one electrical coil 122 together with one another. Each sliding electrical coupler 138 can be in the form of a wire, conductive microspheres in light grease, spring-loaded ball bearings, pins, or other electrical connection devices. If the slider 130 does not include at least one sliding electrical coupler 138, the magnets 134 themselves may be electrically coupled to the input and output power wires 104, 106 and the at least one electrical coil 122.

The at least one magnetic augmentation member 136 is connected to the at least one magnet 134. Each magnetic augmentation member 136 is configured for augmenting the magnetic field of the magnet 134 to which it is attached. One or more magnetic augmentation members 136 may be connected to a single magnet 134. For example, as shown in FIG. 2, there are two magnetic augmentation members 136 connected to a single, respective magnet 134. The at least one magnetic augmentation member 136 may have any desired size and shape. For example, each magnetic augmentation member 136 may be in the form of a plate or a disc with a through-hole therein. The plates on each side of each magnet 134 concentrate the magnetic fields of the magnet 134 and increase the power output. Each magnetic augmentation member 136 may comprise any desired material, such as a highly magnetically permeable like a ferrous metal.

In operation, the power source 102 supplies current to the input power wire 104 and the output power wire 106. The current is then provided to the slider 130, which in turn provides the current to the tubular stator 120. The current is configured for generating an electromagnetic field as the current flows through the tubular stator 120, thereby generating at least one Lorentz force resulting from the electromagnetic field and the magnetic field. The at least one Lorentz force may be configured for axially moving and/or maintaining a position of the slider 130 and/or the tubular stator 120.

When the slider 130 is inserted into the tubular stator 120 and a voltage is applied across the input and output power wires 104, 106, the sliding electrical couplers 138 within each magnet 134 locally conduct electricity to the exposed innermost windings of the at least one electrical coil 122. Since the power wires 104, 106 are connected in an alternating pattern relative to each magnet 134, electricity from each magnet 134 splits and flows into both neighboring magnets 134 by flowing through the at least one electrical coil 122. Electricity is now flowing through the at least one electrical coil 122 in a pattern that alternates directions between every magnet 134. Hence, the electricity flows tangentially relative to the overall longitudinal axis of the electric actuator 110. Since each magnet 134 magnetically opposes its two neighboring magnets 134, the magnetic field lines form in a radial outward pattern between each magnet 134 relative to the longitudinal axis of the electric actuator 110.

Accordingly, the Lorentz force(s) are generated by the interaction of the electromagnetic field(s) of the electrical coil(s) 122 and the magnetic field line(s) of the magnet(s) 134. It is noted that the Lorentz forces are perpendicular to both the electromagnetic field and the magnetic field lines (parallel with the longitudinal axis of the electric actuator 110). In each section or space between magnets 134, the current reverses direction but so too do the magnetic field lines; thus, each section produces a Lorentz force in the same direction.

Therefore, the driving force behind the electric actuator 110 is the net force created by the individual Lorentz forces that are generated in each section between the magnets 134 due to the Lorentz-type interaction between the at least one electrical coil 122 and the magnets 134. The direction and amplitude of the current in the slider 130 directly control the force that the electric actuator 110 outputs. When unpowered, the electric actuator 110 provides no force except for a small frictional force between the stator 120 and slider 130.

By subsequently or indirectly powering the at least one electrical coil 122 via the magnets 134 and/or sliding electrical couplers 138, the desired locations of the at least one electrical coil 122 are powered while maintaining free axial movement of the tubular stator 120 and/or the slider 130. As a result of providing power to the slider 130 first and subsequently powering the stator 120 via the magnets 134 and/or sliding electrical couplers 138, the at least one electrical coil 122 is powered in segments. The spacing of the magnets 134 defines the segments. As noted above, this segmented powering of the stator 120 creates the aligned Lorentz forces. The magnets 134 alternatively sink and source the current to the at least one electrical coil 122. If the entire electrical coil 122 was powered in the same direction, similarly to a conventional linear induction motor, then the resultant Lorentz forces would cancel each other out and cause no effective collective axial actuator force. Also, if the electrical coil 122 was powered directly, then the current could not be routed to the desired locations while still allowing free axial movement.

Figure 3B:
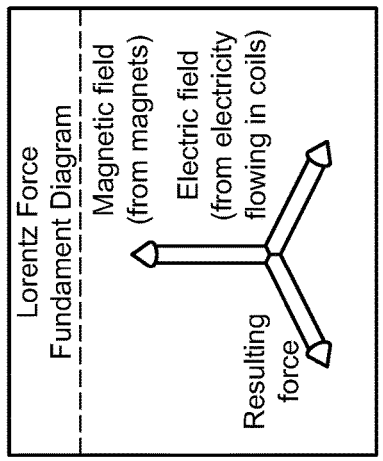
Figure 3C:
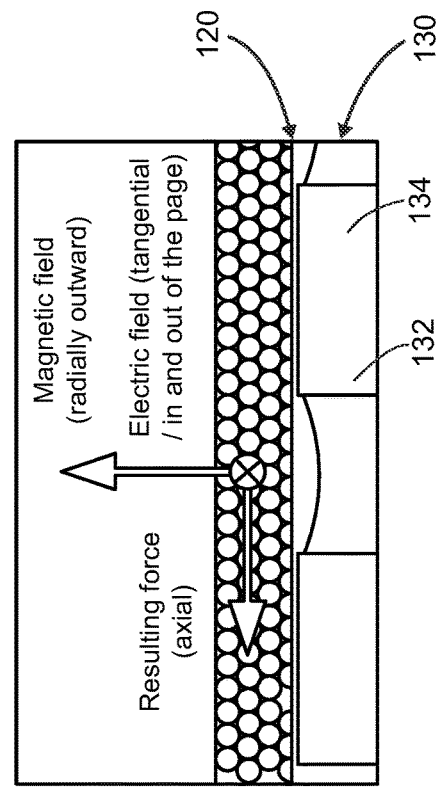

FIGS. 3A-3C are illustrative representations of the electromagnetic and magnetic forces acting within the flexible electric actuator 110. FIG. 3A is an illustrative representation of a top half of a cross-section of the flexible electric actuator 110. In FIG. 3A, the lines, and the spacing therebetween, denote the direction and strength of the electromagnetic field lines of the at least one coil and the magnetic field lines of the magnets 134. The magnetic fields may be strongest at the outer periphery of the magnets 134. The 2D lines going up and down, away from the periphery of a magnet 134, denote a vertical field which in 3D translates to a radial magnetic field around every magnet 134. FIG. 3B is an illustrative representation of a Lorentz force diagram, wherein the resulting perpendicular force is the Lorentz force. FIG. 3C is an illustrative representation of a detailed view of area 3C-3C in FIG. 3A. The Lorentz force illustrated in FIG. 3C is the resulting perpendicular force. Notably, in each subsequent region along the longitudinal axis of the electric actuator 110, the magnetic and electric field directions are both reversed, thus, keeping the Lorentz force oriented in the same direction for every section. These Lorentz forces collectively create a resulting force to axially slide the tubular stator 120 and/or slider 130.

FIG. 4 is an illustrative representation of a partial cross-sectional view of another embodiment of a flexible electric actuator 410. The flexible electric actuator 410 may be substantially similar to the flexible actuator 110, except that the flexible electric actuator 410 does not include magnetic augmentation members 136 or sliding electrical couplers 138. Therein, the input and output power wires 404, 406 are directly electrically coupled to the magnets 434, which in turn are directly coupled to the at least one electric coil 422. Like elements have been identified with like reference characters, except for the 400 series designation.

According to another aspect of the present disclosure, a method for actuating one or more elements is disclosed. The method comprises providing an electric actuator system 100, which includes at least one electric actuator 110, 410. By way of example only, the method is discussed with reference to the electric actuator 110. The method also comprises providing, by the power source 102, the current to the input power wire 104 and the output power wire 106 so that the current passes through the slider 130 and to the tubular stator 120. The method also comprises bending the at least one electric actuator 110, and axially moving the slider 130 and/or the tubular stator 120. The slider 130 and/or the tubular stator 120 are axially moved by generating an electromagnetic field as the current flows through the tubular stator 120 and generating at least one Lorentz force resulting from the electromagnetic field and the magnetic field.

Various exemplary embodiments are disclosed herein. One exemplary embodiment includes an electric actuator, comprising: a tubular stator comprising at least one electrical coil; a slider disposed within and electrically coupled to the tubular stator, the slider comprising: a flexible slider support member; and at least one magnet coupled to the flexible slider support member, the at least one magnet having a magnetic field; and an input power wire and an output power wire disposed within the slider, wherein the input power wire and the output power wire are configured for providing a current from a power source to the slider which in turn provides the current to the tubular stator, wherein the current is configured for generating at least one electromagnetic field as the current flows through the tubular stator, generating at least one Lorentz force resulting from the at least one electromagnetic field and the magnetic field of the at least one magnet for axially moving the slider and/or the tubular stator.

In a further example, the slider and/or the tubular stator are configured for bending and axially sliding. In another example, the at least one magnet directly contacts at least a portion of the at least one electrical coil. As another example, the tubular stator comprises a flexible stator support member coupled to the at least one electrical coil. In another example, the at least one electrical coil has an outer periphery, wherein the flexible stator support member is in the form of a flexible stator substrate molded onto the outer periphery of the at least one electrical coil. As another example, the at least one electrical coil is a single electrical coil. As another example, the at least one electrical coil is progressively wound such that one or more subsequent windings of the at least one electrical coil wrap back and over one or more previous windings of the at least one electrical coil. As another example, the at least one magnet comprises a plurality of magnets coupled to the flexible slider support member. In another example, the plurality of magnets is arranged in a magnetically opposed configuration such that a pair of neighboring magnets magnetically oppose one another. As another example, the slider comprises at least one magnetic augmentation member connected to the at least one magnet, the at least one magnetic augmentation member is configured for augmenting the magnetic field of the at least one magnet.

Another exemplary embodiment includes an electric actuator system, comprising: a power source configured for supplying a current; and at least one electric actuator electrically coupled to the power source, comprising: a tubular stator comprising at least one electrical coil; a slider disposed within and electrically coupled to the tubular stator, the slider comprising: a flexible slider support member; and at least one magnet coupled to the flexible slider support member, the at least one magnet having a magnetic field; and an input power wire and an output power wire disposed within the slider, the input power wire and the output power wire being electrically coupled to the power source, wherein the input power wire and the output power wire are configured for providing the current from the power source to the slider which in turn provides the current to the tubular stator, wherein the current is configured for generating at least one electromagnetic field as the current flows through the tubular stator, generating at least one Lorentz force resulting from the at least one electromagnetic field and the magnetic field of the at least one magnet for axially moving the slider and/or the tubular stator.

As another example, the slider and/or the tubular stator are configured for bending and axially sliding. In another example, the at least one magnet directly contacts at least a portion of the at least one electrical coil. As another example, the tubular stator comprises a flexible stator support member coupled to the at least one electrical coil. In a further example, the at least one electrical coil has an outer periphery, wherein the flexible stator support member is in the form of a flexible stator substrate molded onto the outer periphery of the at least one electrical coil. As another example, the at least one electrical coil is a single electrical coil. As another example, the at least one electrical coil is progressively wound such that one or more subsequent windings of the at least one electrical coil wrap back and over one or more previous windings of the at least one electrical coil. In another example, the at least one magnet comprises a plurality of magnets coupled to the flexible slider support member. As another example, the plurality of magnets is arranged in a magnetically opposed configuration such that a pair of neighboring magnets magnetically oppose one another.

Another exemplary embodiment includes a method for actuating one or more elements, comprising: providing an electric actuator system, the electric actuator system comprising a power source configured for supplying a current and at least one electric actuator electrically coupled to the power source, the at least one electric actuator comprising a tubular stator comprising at least one electrical coil, a slider disposed within and electrically coupled to the tubular stator, the slider comprising a flexible slider support member and at least one magnet coupled to the flexible slider support member, the at least one magnet having a magnetic field, and an input power wire and an output power wire disposed within the slider, the input power wire and the output power wire being electrically coupled to the power source; providing, by the power source, the current to the input power wire and the output power wire so that the current passes through the slider and to the tubular stator; bending the at least one electric actuator; and axially moving the slider and/or the tubular stator by generating at least one electromagnetic field as the current flows through the tubular stator and generating at least one Lorentz force resulting from the at least one electromagnetic field and the magnetic field of the at least one magnet. The steps of the method may be performed in any desired sequence. The method may omit one or more steps described herein. Further, the method may include additional steps not described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An electric actuator, comprising:
a tubular stator comprising at least one electrical coil;
a slider disposed within and electrically coupled to the tubular stator, the slider comprising:
a flexible slider support member; and
at least one magnet coupled to the flexible slider support member, the at least one magnet having a magnetic field, in which the at least one magnet directly contacts at least a portion of the at least one electrical coil; and
an input power wire and an output power wire disposed within the slider,
wherein the input power wire and the output power wire are configured for providing a current from a power source to the slider which in turn provides the current to the tubular stator,
wherein the current is configured for generating at least one electromagnetic field as the current flows through the tubular stator, generating at least one Lorentz force resulting from the at least one electromagnetic field and the magnetic field of the at least one magnet for axially moving the slider and/or the tubular stator.

2. The electric actuator of claim 1, wherein the slider and/or the tubular stator are configured for bending and axially sliding.

3. The electric actuator of claim 1, wherein the tubular stator comprises a flexible stator support member coupled to the at least one electrical coil.

4. The electrical actuator of claim 3, wherein the at least one electrical coil has an outer periphery, wherein the flexible stator support member is in the form of a flexible stator substrate molded onto the outer periphery of the at least one electrical coil.

5. The electric actuator of claim 1, wherein the at least one electrical coil is a single electrical coil.

6. The electric actuator of claim 1, wherein the at least one electrical coil is progressively wound such that one or more subsequent windings of the at least one electrical coil wrap back and over one or more previous windings of the at least one electrical coil.

7. The electric actuator of claim 1, wherein the at least one magnet comprises a plurality of magnets coupled to the flexible slider support member.

8. The electric actuator of claim 7, wherein the plurality of magnets is arranged in a magnetically opposed configuration such that a pair of neighboring magnets magnetically oppose one another.

9. The electric actuator of claim 1, wherein the slider comprises at least one magnetic augmentation member connected to the at least one magnet, the at least one magnetic augmentation member is configured for augmenting the magnetic field of the at least one magnet.

10. An electric actuator system, comprising:
a power source configured for supplying a current; and
at least one electric actuator electrically coupled to the power source, comprising:
a tubular stator comprising at least one electrical coil, wherein the tubular stator comprises a flexible stator support member coupled to the at least one electrical coil, and wherein the at least one electrical coil has an outer periphery, wherein the flexible stator support member is in the form of flexible stator substrate molded onto the outer periphery of the at least one electrical coil;
a slider disposed within and electrically coupled to the tubular stator, the slider comprising:
a flexible slider support member; and
at least one magnet coupled to the flexible slider support member, the at least one magnet having a magnetic field; and
an input power wire and an output power wire disposed within the slider, the input power wire and the output power wire being electrically coupled to the power source,
wherein the input power wire and the output power wire are configured for providing the current from the power source to the slider which in turn provides the current to the tubular stator,
wherein the current is configured for generating at least one electromagnetic field as the current flows through the tubular stator, generating at least one Lorentz force resulting from the at least one electromagnetic field and the magnetic field of the at least one magnet for axially moving the slider and/or the tubular stator.

11. The electric actuator system of claim 10, wherein the slider and/or the tubular stator are configured for bending and axially sliding.

12. The electric actuator system of claim 10, wherein the at least one magnet directly contacts at least a portion of the at least one electrical coil.

13. The electric actuator system of claim 10, wherein the at least one electrical coil is a single electrical coil.

14. The electric actuator system of claim 10, wherein the at least one electrical coil is progressively wound such that one or more subsequent windings of the at least one electrical coil wrap back and over one or more previous windings of the at least one electrical coil.

15. The electric actuator system of claim 10, wherein the at least one magnet comprises a plurality of magnets coupled to the flexible slider support member.

16. The electric actuator system of claim 15, wherein the plurality of magnets is arranged in a magnetically opposed configuration such that a pair of neighboring magnets magnetically oppose one another.

17. A method for actuating one or more elements, comprising:

providing an electric actuator system, the electric actuator system comprising a power source configured for supplying a current and at least one electric actuator electrically coupled to the power source, the at least one electric actuator comprising a tubular stator comprising at least one electrical coil, a slider disposed within and electrically coupled to the tubular stator, the slider comprising a flexible slider support member and at least one magnet coupled to the flexible slider support member, the at least one magnet having a magnetic field, wherein the at least one magnet directly contacts at least a portion of the at least one electrical coil and an input power wire and an output power wire disposed within the slider, the input power wire and the output power wire being electrically coupled to the power source;

providing, by the power source, the current to the input power wire and the output power wire so that the current passes through the slider and to the tubular stator;

bending the at least one electric actuator; and axially moving the slider and/or the tubular stator by generating at least one electromagnetic field as the current flows through the tubular stator and generating at least one Lorentz force resulting from the at least one electromagnetic field and the magnetic field of the at least one magnet.

* * * * *